United States Patent
Huang et al.

(10) Patent No.: US 9,396,005 B2
(45) Date of Patent: Jul. 19, 2016

(54) METHOD, APPARATUS AND COMPUTER STORAGE MEDIUM FOR PLUG-IN MANAGEMENT AND CONTROL

(71) Applicant: TENCENT TECHNOLOGY (SHENZHEN) COMPANY LIMITED, Shenzhen (CN)

(72) Inventors: Tianqing Huang, Shenzhen (CN); Wa Ye, Shenzhen (CN); Yuehai Chen, Shenzhen (CN); Yuan Zhao, Shenzhen (CN); Yuxuan Zhang, Shenzhen (CN); Runjia Huang, Shenzhen (CN); Qing Huang, Shenzhen (CN); Junchao Chen, Shenzhen (CN); Runda Cai, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/487,138

(22) Filed: Sep. 16, 2014

(65) Prior Publication Data

US 2015/0007134 A1    Jan. 1, 2015

Related U.S. Application Data

(63) Continuation of application No. PCT/CN2013/071850, filed on Feb. 25, 2013.

(30) Foreign Application Priority Data

Mar. 16, 2012   (CN) .......................... 2012 1 0071067

(51) Int. Cl.
G06F 9/44      (2006.01)
G06F 9/445     (2006.01)

(52) U.S. Cl.
CPC .............. *G06F 9/44526* (2013.01); *G06F 8/71* (2013.01)

(58) Field of Classification Search
None
See application file for complete search history.

(56) References Cited

U.S. PATENT DOCUMENTS 5,632,022 A * 5/1997 Warren ................. G06F 3/0483
                                               717/109
6,237,135 B1 * 5/2001 Timbol ..................... G06F 8/34
                                               717/107

(Continued)

FOREIGN PATENT DOCUMENTS

CN    1945530 A    4/2007
CN    1968154 A    5/2007

(Continued)

OTHER PUBLICATIONS

Kopliku, et al., "Towards a Framework for Attribute Retrieval"; 2011 ACM; [retrieved on Apr. 22, 2016]; Retrieved from Internet <URL: http://dl.acm.org/citation.cfm?id=2063654>; pp. 515-524.*

(Continued)

*Primary Examiner* — Xi D Chen
(74) *Attorney, Agent, or Firm* — Harness, Dickey & Pierce, P.L.C.

(57) ABSTRACT

A system computer storage medium for plug-in management and control is described. The system performs control on the plug-ins in system or application software by utilizing a plug-in list module and a plug-in function controlling module. The control includes activation and deactivation of the plug-ins, and enables reminding, receiving messages, etc. Plug-ins are managed in a uniform and standardized way in a program.

11 Claims, 6 Drawing Sheets

(56) References Cited

U.S. PATENT DOCUMENTS

| | | | | |
|---|---|---|---|---|
| 6,292,933 | B1* | 9/2001 | Bahrs | H02M 3/258 717/107 |
| 6,694,506 | B1* | 2/2004 | LeBlanc | G06F 9/4428 717/108 |
| 6,742,175 | B1* | 5/2004 | Brassard | G06F 8/71 717/108 |
| 6,862,711 | B1* | 3/2005 | Bahrs | G06F 8/38 717/108 |
| 7,082,386 | B2* | 7/2006 | Srinivasa | G06F 17/50 703/2 |
| 7,454,743 | B2* | 11/2008 | Fuchs | G06F 9/44505 717/107 |
| 7,543,268 | B2* | 6/2009 | Cherdron | G06F 8/20 717/109 |
| 8,386,524 | B2* | 2/2013 | Abrahams | G06F 8/30 717/109 |
| 2004/0010776 | A1* | 1/2004 | Shah | G06F 11/3604 717/108 |
| 2004/0148586 | A1* | 7/2004 | Gilboa | G06F 8/38 717/108 |
| 2005/0071803 | A1* | 3/2005 | Cherdron | G06F 8/20 717/107 |
| 2005/0071805 | A1* | 3/2005 | Lauterbach | G06F 8/20 717/107 |
| 2005/0144587 | A1* | 6/2005 | Bryant | G06F 11/3006 717/111 |
| 2006/0248223 | A1 | 11/2006 | Akimoto et al. | |
| 2010/0211991 | A1 | 8/2010 | Akutsu | |
| 2010/0325085 | A1* | 12/2010 | Stritzel | G06F 8/60 707/609 |
| 2010/0333082 | A1* | 12/2010 | Keys | G06F 8/68 717/173 |
| 2011/0055279 | A1 | 3/2011 | Terasaka | |
| 2012/0036496 | A1* | 2/2012 | Yang | G06F 9/44 717/121 |
| 2014/0181788 | A1* | 6/2014 | Sullivan | G06F 9/4443 717/109 |
| 2015/0052509 | A1* | 2/2015 | Wang | G06F 9/44526 717/168 |
| 2015/0135160 | A1* | 5/2015 | Gauvin | H04W 4/001 717/109 |

FOREIGN PATENT DOCUMENTS

| | | |
|---|---|---|
| CN | 101291305 A | 10/2008 |
| CN | 101937353 A | 1/2011 |
| CN | 102253840 A | 11/2011 |
| JP | 2006309621 A | 11/2006 |
| JP | 2010191610 A | 9/2010 |

OTHER PUBLICATIONS

Janus, "Towards a common Agile Software Development Model", 2012 ACM SIGSOFT Software Engineering Notes;[retrieved on Apr. 22, 2016]; Retrieved from Internet <URL: http://dl.acm.org/citation.cfm?id=2237803>; pp. 1-8.*

Liu, et al., "On the Construction of EASTWeb Framework—Plug-in Framework for Processing Earth Observation Data Streams"; 2014 IEEE; [retrieved on Apr. 22, 2016]; Retrieved from Internet <URL: http://ieeexplore.ieee.org/stamp/stamp.jsp?tp=&arnumber=6871809>; pp. 463-467.*

Cholia, Sun, "The NEWT Platform: An Extensible Plugin Framework for Creating ReSTful HPC APIs"; 2014 IEEE;[retrieved on Apr. 22, 2016]; Retrieved from Internet <URL: http://ieeexplore.ieee.org/stamp/stamp.jsp?tp=&arnumber=7021843>; pp. 17-20.*

International Preliminary Report for International Application No. PCT/CN2013/071850 dated Sep. 16, 2014.

Chinese Office Action for Application No. 201200710675 dated Dec. 9, 2014, and an English concise explanation of relevance thereof.

European Search Report for Application No. 13761615.7 dated Mar. 9, 2015.

Salzman, Peter Jay, Michael Burian, and Ori Pomerantz. The Linux Kernel Module Programming Guide. Version 2.6.4. 2001.

Japanese Office Action for Application No. 2014-561272 dated Oct. 6, 2015, and its English translation thereof.

International Search Report for Application No. PCT/CN2013/071850 dated May 30, 2013, and its English translation thereof.

* cited by examiner

METHOD, APPARATUS AND COMPUTER STORAGE MEDIUM FOR PLUG-IN MANAGEMENT AND CONTROL

CROSS-REFERENCE TO RELATED APPLICATIONS

This application is a continuation of International Application No. PCT/CN2013/071850, filed on Feb. 25, 2013. This application claims the benefit and priority of Chinese Application No. 201210071067.5, filed on Mar. 16, 2012. The entire disclosures of each of the above applications are incorporated herein by reference.

FIELD

The present disclosure relates to software and internet technologies and to a method, apparatus and computer storage medium for plug-in management and control.

BACKGROUND

This section provides background information related to the present disclosure which is not necessarily prior art.

In much software operating on personal computers or mobile intelligent terminals, plug-in technology is used. A plug-in is a program designed to follow a certain standard application program interface. Each plug-in usually performs a specific function. For example, common plug-ins in a browser include a Flash plug-in, a RealPlayer plug-in, an ActiveX, etc. After a related plug-in is installed in the browser, a web browser can directly call the plug-in program to complete a certain specific function.

In software development for mobile Internet, many plug-ins are usually integrated in the application software of a mobile user terminal or a mobile terminal. However, there is not an effective and unified management control method in the related art to manage these plug-ins. Usually, each plug-in provides its own interface settings to control the interface displaying, message prompt (such as sound, vibration, mark), loading (such as whether to automatically load), system data utilization (such as whether geographic information provided by a system can be used), etc. of the individual plug-in. Such an independent fragmented management control method has a lower efficiency, and does not enable effective control for a plug-in with no management interface or an undesirable management interface. For example, the above method can only control selected functions of one plug-in, and cannot control features such as opening, closing, or hiding the plug-in.

SUMMARY

This section provides a general summary of the disclosure, and is not a comprehensive disclosure of its full scope or all of its features.

According to various embodiments, the present disclosure discloses a method, apparatus, and computer storage medium for plug-in management and control. The disclosure may be applied, for example, the plug-ins may be integrated in a system or in applications managed and controlled independently and the management process is complicated and inefficient, and it is unable to manage and control general attributes of the plug-ins uniformly.

Various embodiments of the present disclosure provide a method for plug-in management and control, which includes the following:

retrieving registered plug-ins and organizing and managing the registered plug-ins in a centralized way by utilizing a plug-in list module;

providing a corresponding plug-in function controlling sub-module for each of the plug-ins, calling the plug-in function controlling sub-module corresponding to each of the plug-ins by the plug-in list module, managing and controlling functions of each of the plug-ins through the plug-in function controlling sub-module corresponding to each of the plug-ins;

extracting general attributes of multiple plug-ins and managing and controlling the general attributes uniformly through a general attribute controlling sub-module.

Various embodiments of the present disclosure also provide an apparatus for plug-in management and control, which includes the following:

a plug-in list module configured to retrieve registered plug-ins and organize and manage the registered plug-ins in a centralized way;

a plug-in function controlling module configured to provide a container for a general attribute controlling sub-module and a plug-in function controlling sub-module of each of the plug-ins;

the plug-in function controlling sub-module configured to manage and control functions of each of the plug-ins;

the general attribute controlling sub-module configured to manage and control general attributes of multiple plug-ins uniformly.

Various embodiments of the present disclosure also provide a computer storage medium storing computer-executable instructions for implementing the method for plug-in management and control of various embodiments of the present disclosure.

Various embodiments of the present disclosure control plug-ins in a system or in application software by utilizing a plug-in list module and a plug-in function controlling module. The control includes on and off of the plug-ins, methods for reminding, various types of receivable messages, and so on. In various embodiments of the present disclosure, continuously increasing plug-ins can be managed in a uniform and standardized way through a program. Thus, the efficiency of the control and management of plug-ins can be improved and the simplicity and manipulation of software can be enhanced.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In order to make the objectives, technical solutions, and advantages of the present disclosure more clear, various embodiments of the present disclosure will be described in detail with reference to the accompanying drawings.

Figure 1:
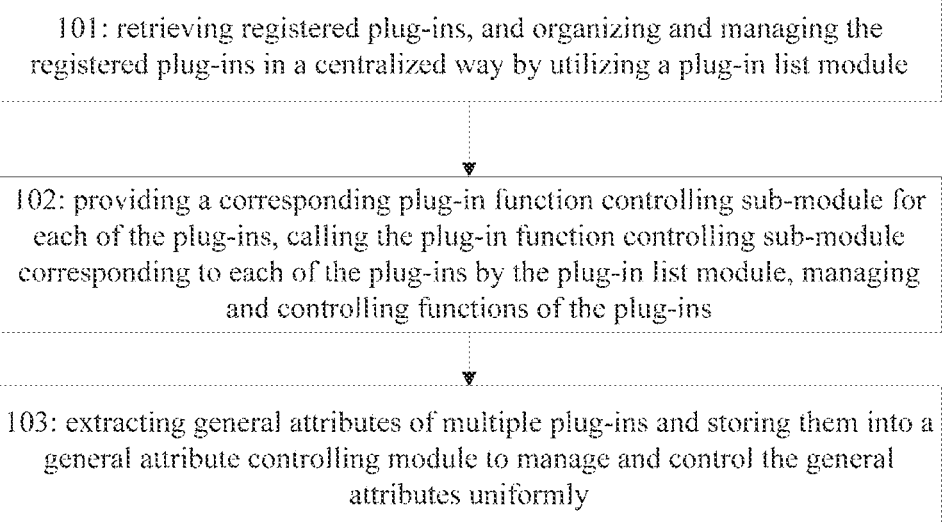
FIG. 1 is an implementation step flowchart for plug-in management and control provided according to various embodiments of the present disclosure.

FIG. 1 is an implementation flowchart of a method for plug-in management and control provided according to various embodiments. The method includes the following:

At 101: retrieving registered plug-ins, and organizing and managing the registered plug-ins in a centralized way by utilizing a plug-in list module.

Figure 2:
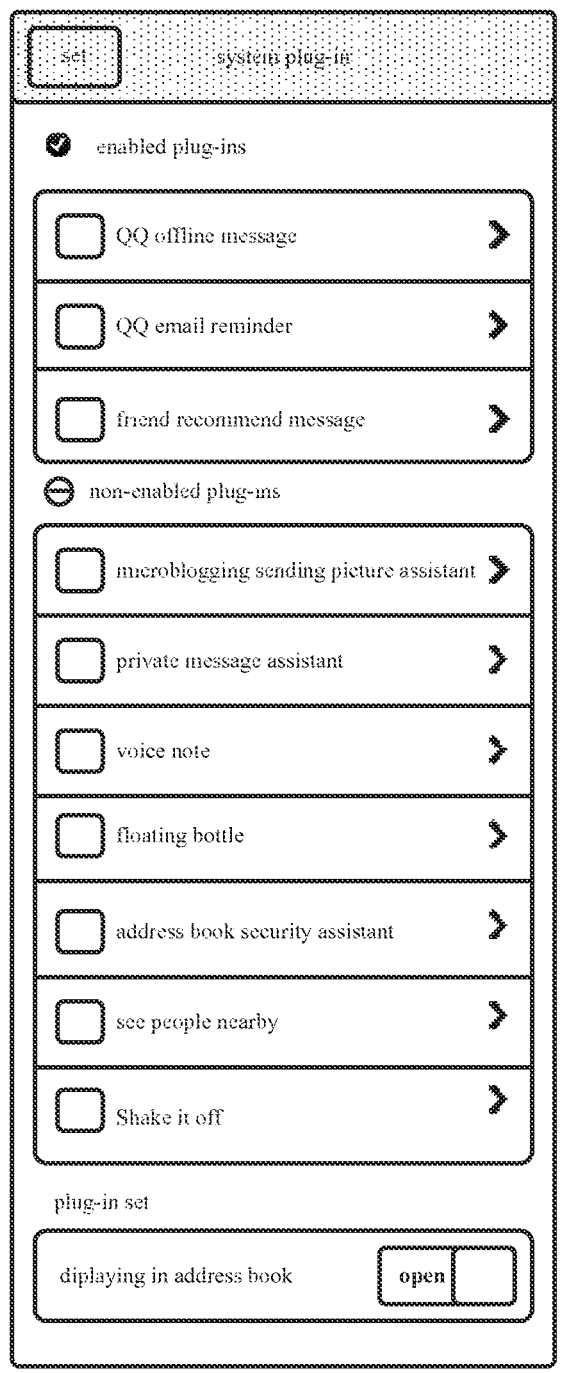
FIG. 2 is a plug-in management interface of a plug-in list module of a social application according to various embodiments of the present disclosure.

For system or application software, the present disclosure provides an entry module, i.e., the plug-in list module, for managing and controlling the registered plug-ins of the system or application software in a centralized way. The plug-in list module organizes and manages the registered plug-ins by utilizing a data structure such as queue, linked list, object array, etc., and displays basic information of the registered plug-ins in the form of a list, an icon or other display form. An example where the plug-in list module displays the basic information of the plug-ins is shown in FIG. 2. The basic information of each of the plug-ins at least includes a name of each of the plug-ins, and can further include state of each of the plug-ins, for example, a plug-in is now in an enabled state or a non-enabled state.

A user can call a plug-in function controlling sub-module corresponding to each of the plug-ins through the plug-in list module. For example, each list item in a plug-in list can include a corresponding plug-in function controlling sub-module handle; when the user clicks on a corresponding item, a corresponding plug-in function controlling sub-module is called by an event response function.

The plug-in list module can also provide functions of opening a plug-in or closing the plug-in. For example, opening or closing functions can be provided for a corresponding plug-in in manner of a menu or a switch button, without the need for calling a plug-in function controlling sub-module.

In various embodiments of the present disclosure, in order to provide the user with an opportunity to choose whether to install a corresponding plug-in according to the user's request, an issued plug-in can first be displayed in a group which is not installed or enabled in the plug-in list module, and the user can choose to enable or not enable a plug-in according to the user's wish. Where a corresponding plug-in is not installed, when enabling the plug-in, the system can prompt the user whether to install; if the user agrees, the corresponding plug-in is downloaded and installed in the local, and then the plug-in is enabled.

In various embodiments, registration refers to registering in an operating system or a plug-in publishing platform. Only registered plug-ins can be displayed and managed in the plug-in list module.

The plug-in list module can also provide functions of installing or uninstalling plug-ins. For example, the functions of adding and deleting plug-ins can be provided in the manner of a menu.

At 102: providing a corresponding plug-in function controlling sub-module for each of the plug-ins, calling the plug-in function controlling sub-module corresponding to each of the plug-ins by the plug-in list module, managing and controlling functions of the plug-ins through the plug-in function controlling sub-module corresponding to each of the plug-ins.

In various embodiments, a plug-in function controlling module functions as a container to provide a load space for a general attribute controlling sub-module and a plug-in function controlling sub-module of each plug-in. Installing or uninstalling each sub-module is performed by the plug-in function controlling module, and the plug-in function controlling module maintains and manages each plug-in function controlling sub-module.

In various embodiments, a corresponding plug-in function controlling sub-module is provided for each plug-in. The plug-in function controlling sub-module of each plug-in can perform deep and complete management and control on functions of each plug-in, for example, providing one or more of following functions of management and control:

(1) Opening or closing a plug-in: here, the opening or closing functions are provided by a plug-in function controlling sub-module for an individual plug-in, and are different from the centralized management control mode provided by the plug-in list module. Closing one plug-in is equivalent to setting a state of the plug-in to be an inactive state in the plug-in function controlling module; when the system or software is started up, the plug-in which is in the inactive state will not be loaded in a memory. When enabling one plug-in, the corresponding plug-in is accordingly activated in the plug-in function controlling module.

(2) Managing displaying positions and modes of plug-ins: for example, whether to display a plug-in in a main interface or an address book can be controlled; font size, color, etc. of plug-in displaying can be controlled.

Figure 3:
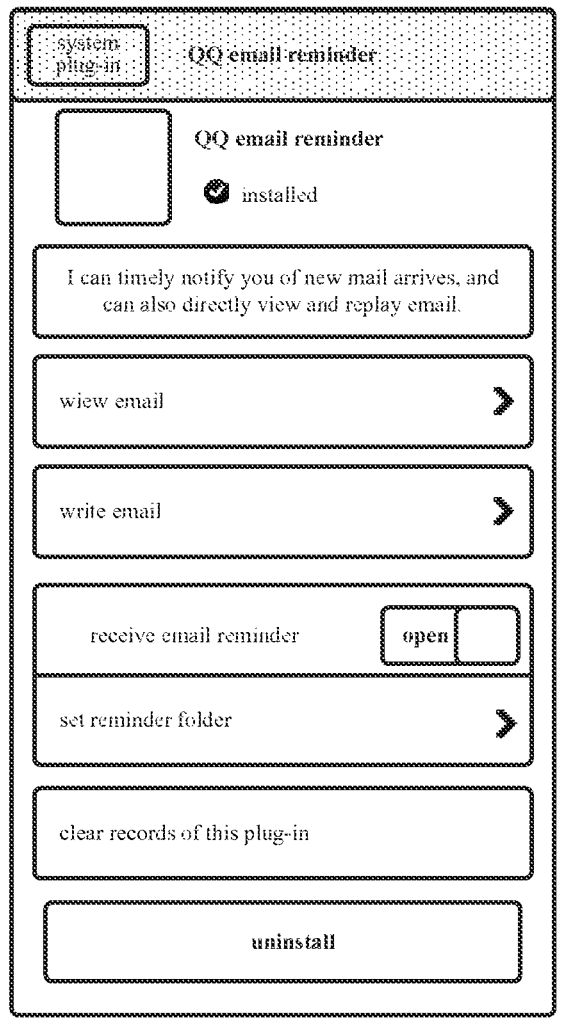
FIG. 3 is an interface of a plug-in function controlling sub-module of an email reminder plug-in provided according to various embodiments of the present disclosure.
Figure 4:
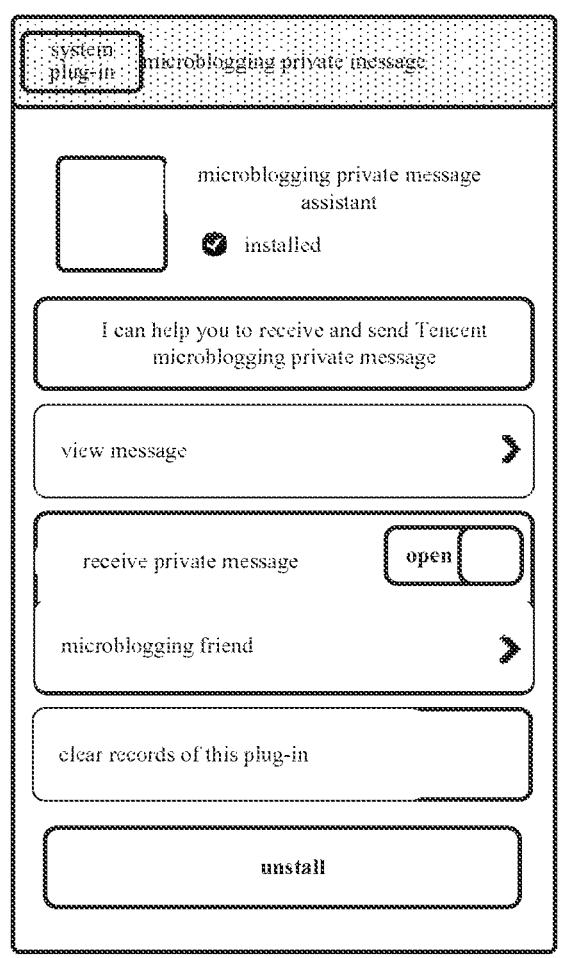
FIG. 4 is an interface of a plug-in function controlling sub-module of a microblogging private message plug-in provided according to various embodiments of the present disclosure.
Figure 5:
FIG. 5 is an interface of a plug-in function controlling sub-module of an offline message plug-in provided according to various embodiments of the present disclosure.

(3) Capable of controlling a plug-in to send a message to a server or receive a message sent from the server: for example, for an email reminder plug-in, as shown in FIG. 3, whether to receive an email reminder sent from the server can be controlled. For a microblogging private message plug-in, as shown in FIG. 4, whether to receive and send a microblogging private message and/or a microblogging private notification. For an offline message plug-in, as shown in FIG. 5, whether to receive an offline message, etc. sent from the server can be controlled.

(4) Capable of viewing and managing specific information related to a plug-in through the plug-in function controlling module: for example, for the microblogging private message plug-in, as shown in FIG. 4, a microblogging friend list can be viewed through the plug-in function controlling module corresponding to the plug-in. For the email reminder plug-in, as shown in FIG. 3, an email can be viewed through the plug-in function controlling module corresponding to the plug-in. For the offline message plug-in, as shown in FIG. 5, an offline message can be viewed through the plug-in function controlling module corresponding to the plug-in.

At 103: extracting general attributes of multiple plug-ins and storing them into a general attribute controlling module to manage and control the general attributes uniformly.

In various embodiments, the general attributes of multiple plug-ins are extracted, and these general attributes are managed and controlled uniformly so as to avoid separate control of same functions of each plug-in, reduce redundant complicated operations, and improve efficiency of management and control. The general attributes include, but are not limited to, scene mode, message prompt manner, etc. For example, many plug-ins need to receive a message pushed by the server or some prompt messages generated by themselves. In various embodiments of the present disclosure, the general attribute controlling module provides a scene mode and/or message prompt manner setting function to control the way to remind a user when a plug-in receives a message pushed by the server or when the plug-in itself generates a prompt message. For example, the prompt manner can include any one or more of the following: sound, vibration, and displaying prompt mark. Setting functions such as choosing alert tone can also be provided.

Implementation of the management of the general attributes can include the following: assigning different priorities to settings made for different modules, assigning higher priorities to general attribute control parameters set by the general attribute controlling module, assigning lower priorities to general attribute control parameters set by the plug-in function controlling sub-module, and giving priority to a high-priority setting.

The present disclosure is further explained with reference to a social application as an example. The social application is mobile communication software which can integrate a plurality of plug-ins, support sending a voice message, video, images, and text, realize multi-user group chat, and is used in a mobile intelligent terminal such as a mobile phone, iPad, etc. Plug-ins registered or integrated in the social application include, but are not limited to: an email reminder plug-in, a microblogging private message plug-in, an offline message plug-in of an instant messaging system, a microblogging sending picture assistant plug-in, a find friend plug-in based on geographical positions, a friend recommend plug-in, a voice note, etc.

FIG. 2 is a plug-in management interface of a plug-in list module of the social application. It can be seen from the interface that plug-ins registered in the social application can be displayed in a tabular form. A plug-in queue can be managed in the plug-in list module. The plug-in queue can flexibly increase or decrease and open or close plug-ins. When a new plug-in is registered, the new plug-in can be directly inserted into the queue. When it is needed to uninstall a plug-in, the plug-in can be directly deleted from the queue. Thus, the plug-in queue has very good extensibility. A corresponding relationship between the plug-in list and the plug-in queue can facilitate the opening and closing operation of a specified plug-in.

FIG. 3 is an interface of a plug-in function controlling sub-module of an email reminder plug-in. The email reminder plug-in can be used to achieve docking with an email system so that the user can timely know whether an email is received. The plug-in function controlling sub-module can perform thorough and complete control on functions of the email reminder plug-in. The control functions include but are not limited to the following: whether to receive an email reminder, receiving an email reminder from any of the email accounts, view an email and an email box, whether to display the plug-in in an address book, etc.

FIG. 4 is an interface of a plug-in function controlling sub-module of a microblogging private message plug-in. The microblogging private message plug-in can be used to achieve docking with a microblogging system so that the user can timely know whether there is a private microblogging message sent to the user from a microblogging friend. The plug-in function controlling sub-module can perform thorough and complete control on functions of the microblogging private message plug-in. The control functions include but are not limited to the following: whether to receive and send a microblogging private message, whether to receive a microblogging private notification, view microblogging friends, whether to display the plug-in in an address book, etc.

FIG. 5 is an interface of a plug-in function controlling sub-module of an offline message plug-in. The offline message plug-in can be used to achieve docking with an instant messaging system so that the user can timely know whether there is an offline message sent to the user from an instant messaging friend. The plug-in function controlling sub-module can perform deep and complete control on functions of the offline message plug-in. The control functions include but are not limited to: whether to receive an offline message pushed by a server, view an offline message, whether to display the plug-in in an address book, etc.

Figure 6:
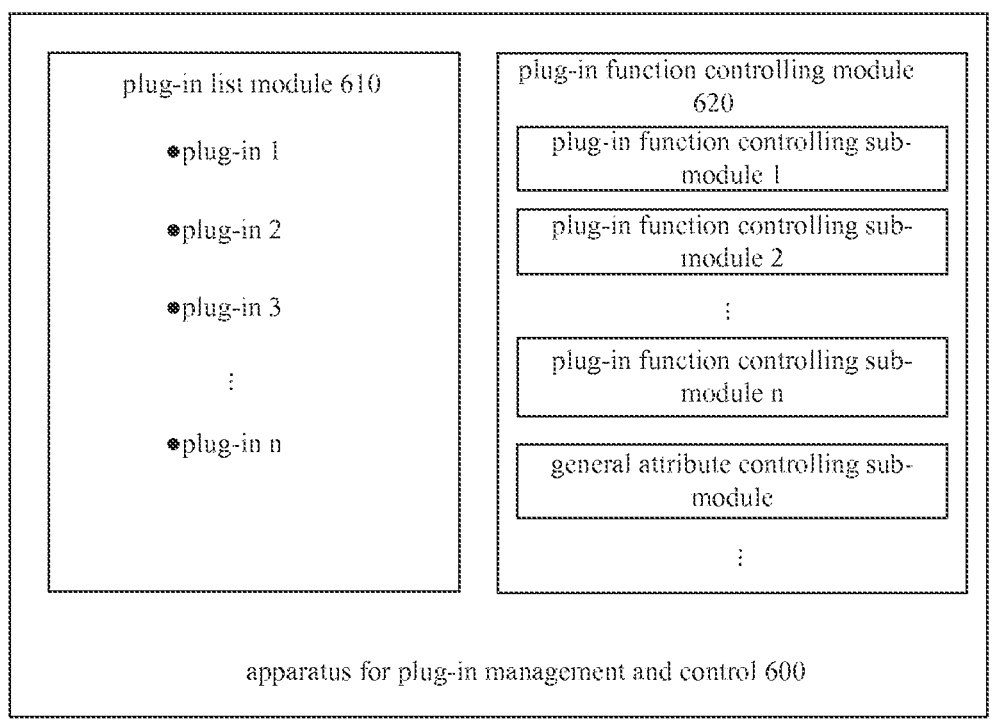
FIG. 6 is a diagram of an apparatus for plug-in management and control provided according to various embodiments of the present disclosure.

FIG. 6 is a diagram of function modules of an apparatus for plug-in management and control based on the method for plug-in management and control provided in various embodiments of the present disclosure. The apparatus 600 includes the following:

a plug-in list module 610 configured to retrieve registered plug-ins, and organize and manage the registered plug-ins in a centralized way;

a plug-in function controlling module 620 configured to provide a container for a general attribute controlling sub-module and a plug-in function controlling sub-module of each plug-in;

at least one plug-in function controlling sub-module 1~n, configured to manage and control functions of each plug-in; the lug-in function controlling sub-modules being corresponding to the plug-ins in a one-to-one manner;

the general attribute controlling sub-module configured to manage and control general attributes of multiple plug-ins uniformly.

The organization and management of the registered plug-ins in a centralized way performed by the plug-in list module 610 include one or more of following: opening plug-in, closing plug-in, adding plug-in, deleting plug-in.

The management and control of functions of the plug-ins performed by the plug-in function controlling sub-modules include one or more of the following:

(1) opening or closing a plug-in;

(2) managing displaying positions and modes of plug-ins;

(3) controlling a plug-in to send a message to a server or receive a message sent from the server;

(4) viewing and managing specific information related to a plug-in; and (5) the general attributes at least contain scene mode and/or message prompt manner.

Each plug-in function controlling sub-module can provide different management control functions according to different functions of each plug-in. The above functions are only examples, and specific situations can be determined according to requirements.

The plug-ins can contain one or more of an email reminder plug-in, a microblogging private message plug-in, an offline message plug-in of an instant messaging system, a microblogging sending picture assistant plug-in, a find friend plug-in based on geographical positions, a friend recommend plug-in, etc.

If the modules described in the various embodiments are implemented in the form of software function modules and sold or used as an independent product, they can also be stored in a computer-readable storage medium.

The various embodiments can be implemented, at least in part, in software. The computer software is stored in a storage medium and includes a plurality of instructions to make a computer apparatus (such as a personal computer, a server, a network equipment, etc.) execute all or parts of the method described in each of the embodiments of the present disclosure. The aforementioned storage medium includes U disk, mobile hard disk, Read-Only Memory (ROM), Random Access Memory (RAM), Disk or CD or other medium which can store program codes. Thus, the various embodiments are not limited to any specific combination of hardware and software.

Accordingly, various embodiments also provide a computer storage medium which stores computer programs for implementing the method for adding friends in the above embodiments of the present disclosure.

The foregoing various embodiments should not limit the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A computer implemented method for plug-in management and control, comprising:
    retrieving registered plug-ins, and displaying basic information and items corresponding to the registered plug-ins on a first user interface to organize and manage the registered plug-ins in a centralized way; and
    extracting a general attribute of multiple registered plug-ins, and setting the general attribute by using a setting item on the first user interface to uniformly manage and control the multiple registered plug-ins which have the general attribute
    wherein the method further comprises:
    triggering an item corresponding to a registered plug-in to call a second user interface through which functions of the registered plug-in are managed and controlled.

2. The method of claim 1, wherein managing the registered plug-ins in the centralized way comprises content containing at least one of opening plug-in, closing plug-in, adding plug-in, or deleting plug-in.

3. The method of claim 1, wherein managing and controlling the functions of the registered plug-in comprises at least one of:
    opening or closing the registered plug-in;
    managing a displaying position and mode of the registered plug-in;
    controlling the registered plug-in to send a message to a server or receive a message sent from the server; or
    viewing and managing specific information related to registered the plug-in.

4. The method of claim 1, wherein the general attribute at least comprises scene mode and/or message prompt manner.

5. The method of claim 1, wherein the registered plug-ins comprise one or more of an email reminder plug-in, a microblogging private message plug-in, an offline message plug-in of an instant messaging system, a microblogging sending picture assistant plug-in, a find friend plug-in based on geographical positions, a friend recommend plug-in and a voice note.

6. An apparatus for plug-in management and control, comprising:
    one or more processors, and
    memory, with instructions stored thereon, that when executed by the one or more processor, perform the steps of:
    retrieving registered plug-ins, and displaying basic information and items corresponding to the registered plug-ins on a first user interface to organize and manage the registered plug-ins in a centralized way; and
    extracting a general attribute of multiple registered plug-ins, and setting the general attribute by using a setting item on the first user interface to uniformly manage and control the multiple registered plug-ins which have the general attribute
    wherein the memory stores the instructions, that when executed by the one or more processor, further perform the step of:
    triggering an item corresponding to a registered plug-in to call a second user interface through which functions of the registered plug-in are managed and controlled.

7. The apparatus of claim 6, wherein organizing and managing the registered plug-ins in the centralized way comprises at least one of opening plug-in, closing plug-in, adding plug-in, or deleting plug-in.

8. The apparatus of claim 6, wherein managing and controlling functions of each of the plug-ins comprises at least one of:
    opening or closing the registered plug-ins;
    managing a displaying position and mode of the registered plug-ins;
    controlling the registered plug-in to send a message to a server or receive a message sent from the server; or
    viewing and managing specific information related to the registered plug-in.

9. The apparatus of claim 6, wherein the general attribute at least comprises scene mode and/or message prompt manner.

10. The apparatus of claim 6, wherein the registered plug-ins comprise one or more of an email reminder plug-in, a microblogging private message plug-in, an offline message plug-in of an instant messaging system, a microblogging sending picture assistant plug-in, a find friend plug-in based on geographical positions, a friend recommend plug-in and a voice note.

11. A non-transitory computer storage medium storing computer-executable instructions to direct at least one processor to perform the steps of:
- retrieving registered plug-ins, and displaying basic information and items corresponding to the registered plug-ins on a first user interface to organize and manage the registered plug-ins in a centralized way; and
- extracting a general attribute of multiple registered plug-ins, and setting the general attribute by using a setting item on the first user interface to uniformly manage and control the multiple registered plug-ins which have the general attribute;
- wherein the non-transitory computer storage medium stores the computer-executable instructions to direct the at least one processor further to perform the step of:
- triggering an item corresponding to a registered plug-in to call a second user interface through which functions of the registered plug-in are managed and controlled.

* * * * *